United States Patent [19]

Manko

[11] 3,945,556

[45] Mar. 23, 1976

[54] FUNCTIONAL ALLOY FOR USE IN AUTOMATED SOLDERING PROCESSES

[75] Inventor: Howard H. Manko, Teaneck, N.J.

[73] Assignee: Alpha Metals, Inc., Jersey City, N.J.

[22] Filed: Feb. 25, 1975

[21] Appl. No.: 552,808

[52] U.S. Cl.............................. 228/263; 75/175 A
[51] Int. Cl.².......................................... C22C 13/00
[58] Field of Search................... 75/175 A; 228/263

[56] References Cited
UNITED STATES PATENTS

| | | | |
|---|---|---|---|
| 1,087,561 | 2/1914 | Tebbetts | 75/175 A X |
| 1,568,224 | 1/1926 | Karafiat | 75/175 A X |
| 1,669,580 | 5/1928 | Speichert | 75/175 A X |
| 3,607,252 | 9/1971 | North | 75/175 A |

*Primary Examiner*—L. Dewayne Rutledge
*Assistant Examiner*—E. L. Weise
*Attorney, Agent, or Firm*—Stefan J. Klauber

[57] ABSTRACT

A solder alloy for use in automated soldering of workpieces by application thereto of liquid solder from a molten reservoir. The alloy consists essentially of from about 50 to 57.5% by weight tin, from about 1.5 to 4% by weight antimony, with the balance being substantially lead. The alloy is preferably further characterized in displaying a solidus-to-liquidus temperature range no greater than that of a 60/40 weight ratio tin/lead solder.

5 Claims, No Drawings

FUNCTIONAL ALLOY FOR USE IN AUTOMATED SOLDERING PROCESSES

BACKGROUND OF INVENTION

This invention relates generally to soldering alloys, and more specifically relates to alloy compositions useful in machine soldering applications.

The use of machine (or "automated") soldering operations, is an indispensable aspect of many modern industrial applications. A particularly noteworthy example is the use of such techniques in the electronics and related industries. In a typical operation common in such industries, for example, an integrated circuit package may be soldered to the conductive pattern of a printed circuit board, by disposing the package on the board with the leads from the package inserted into and through openings in the board. These board openings may, for example, be placed through, and interconnected by the aforementioned printed circuit pattern. Electrical connection is thereupon effected between the leads and printed pattern, by contacting the lower surface of the board with a volume of molten solder in a suitable reservoir.

As is known in the art of machine soldering, various techniques may be used for effecting contact between the workpiece to be soldered and the molten volume of solder in its reservoir. In some instances, for example, so-called dip soldering techniques are used. These are basically static in nature, which is to say that the workpiece is simply immersed into the reservoir of molten soldering alloy and withdrawn after a specified period. In other instances dynamic techniques are utilized. Thus the workpiece — e.g. a pre-fluxed circuit board — may be passed face downward along the surface of the solder bath, or it may be conveyed across the crest of a standing wave or weir of flowing solder pumped out of a nozzle communicating with the molten reservoir.

As opposed to the relatively simple requirements for alloys used in hand-soldering, certain rather stringent requirements are imposed upon the soldering alloys used in the aforementioned automated soldering environments. The soldering alloys so utilized, must, among other things, display rheological characteristics such as to provide high mobility and free-flow of the melt. The flow and wetting characteristics of the melt must assure that effective and rapid wetting of the workpiece occurs even under the stringent requirements of the dynamic mode of operation mentioned above.

Particularly where soldering of circuit boards or other workpieces including solid state electronic devices is involved, the time and temperature of exposure during soldering are highly significant. This is true in that many of the electronic devices thus exposed, are quite sensitive to heat damage. In general, therefore, the alloy used should have as low a melting point as possible. The rheological characteristics and time and temperature of exposure are also significant in that it is desirable to limit diffusion into the materials of the workpiece. Typically it is desirable to work at about 120°F above the melting point in the type of environment of interest.

A particularly significant aspect of automated soldering from a molten reservoir, is the problem of avoiding production of cold or disturbed joints in the soldered components. Again this problem can become particularly acute where a dynamic mode of machine soldering is utilized, such as, for example, the wave soldering techniques previously alluded-to.

In order to minimize the aforementioned difficulties encountered in automated soldering, it has been generally recognized desirable, to utilize a soldering alloy which is close to the tin-lead eutectic composition. Cost factors aside, the ideal composition for such purposes is indeed the tin-lead eutectic, i.e. a nominally 63% tin, 37% lead alloy, which, as is well-known, has a sharp and distinct melting point at 361°F. Use of such eutectic composition results in fine-grained joints having excellent mechanical properties.

In practice, the eutectic composition above mentioned, may be modified by addition of small fractional percentages of certain elements. For example, Federal Specification QQ-S-571 calls for 0.10 to 0.25% antimony — which element inhibits the risk of white-to-grey tin transformation in soldered joints exposed to temperatures less than 55.8°F. or 13.2°C. The said specification also permits the presence of certain other impurities within prescribed limits.

Notwithstanding the advantages of the aforementioned eutectic tin-lead composition, it is in general not widely utilized in automated soldering processes, because of the very cost of tin. This factor is so compelling, that it has been deemed desirable to utilize tin/lead alloys wherein the content of tin is lowered to such degree as does not seriously impair the usefulness of the alloy in machine soldering applications. In general, it has been considered in the past that the practical limit of such displacement extended no further than about the use of a so-called "60/40" solder, i.e. a solder with a nominal composition of 60% tin and 40% lead. Theoretically a 60/40 solder has an approximate solidus-to-liquidus range of 13°F. It may, however, be noted in this connection that as used in this specification, the term "60/40" solder refers to the nominal composition identified as "Sn 60" in the aforementioned Federal Specification QQ-S-571. Taking this factor into consideration, the 60/40 alloy commercially available can, pursuant to the said Federal Specification, actually display a solidus-to-liquidus range as much as 17°F, at the allowable 59.5% tin, and it is this latter numerical value which is intended hereinbelow, where reference is made to the "solidus-to-liquidus range of 60/40 solder".

SUMMARY OF INVENTION

Now in accordance with the present invention, it has unexpectedly been discovered that outstanding results are yielded in automated soldering processes of the type heretofore discussed, where a solder alloy is utilized, consisting essentially of from about 50 to 57.5% by weight of tin, from about 1.5 to 4% by weight antimony, with the balance being substantially lead. In a preferable form of the invention, the proportions of the components are so adjusted within the range indicated, that the alloy is further characterized in displaying a solidus-to-liquidus temperature range no greater than that of 60/40 weight ratio tin-lead solder. A relatively optimum composition of this type may thus include by weight approximately 55% tin, 42.23% lead, and 2.77% antimony. This latter composition is found to display a solidus-to-liquidus temperature range of approximately 2°–3°F, and is therefore, in spite of a relatively low tin content, (together with the attendant economic advantages) extremely well-suited to automated soldering

DESCRIPTION OF PREFERRED EMBODIMENT

Compositions useful in accordance with the present invention may consist essentially of from about 50 to 57.5% by weight tin, from about 1.5 to 4% by weight antimony, with the balance being substantially lead. It will be appreciated by those skilled in the present art that the compositional range indicated may define a three-dimensional phase diagram which, in turn, indicates a solidus-to-liquidus temperature range for any given composition within the values specified. It has been found in accordance with the invention, that the solidus-to-liquidus range corresponding to the limits mentioned, is approximately 30°F, and it has been found further, that such compositions when used in automated soldering processes, yield soldered joints which in terms of mechanical and electrical properties are at least as acceptable as those yielded with a conventional 60/40 solder — even where the values of the composition mentioned reside at the outer limits of the range specified.

Preferred compositions in accordance with the invention include proportions of the components specified, such as to define an alloy characterized in displaying a solidus-to-liquidus temperature range no greater than that of the 60/40 weight ratio tin/lead solder. This range (as previously mentioned) is approximately 17°F, and the approximate corresponding component range of these preferred alloys are from about 51 to 54% weight tin, from about 2 to 3.5% weight antimony, and the balance lead.

A relatively optimal composition in accordance with the invention includes approximately 55% tin, 42.23% lead, and 2.77% antimony. This composition, in spite of a considerable reduction in tin content in comparison to the aforementioned 63/37 solder alloy, is found to possess a solidus-to-liquidus temperature range of approximately 2° to 3°F — in consequence of which the composition is extremely close in melting characteristics to the eutectic composition. The cited composition is specifically found, to display a solidus at approximately 366.5°F, and a liquidus at approximately 368.5°F. The superior characteristics of this particular composition as set forth in the following Example:

EXAMPLE I

A soldering alloy in accordance with the invention was prepared, including by weight 55% tin, 42.23% lead, and 2.77% antimony. As already indicated, the solidus-to-liquidus temperature range for such alloy was established at between 2° and 3°F, depending upon the testing methods utilized. Various tests were conducted for the purpose of comparing the characteristics of this alloy when used in automated soldering, with results yielded by use of prior art alloys, such as 60/40 alloy. In a first test the comparative drossing characteristics of the inventive composition was compared with a 60/40 alloy. In a typical run it was found that the 60/40 alloy yielded approximately 84.6 grams/hour of dross, whereas the test alloy yielded 78.6 grams/hour of dross—which indicates approximately comparable properties.

Comparison tests were then undertaken with regard to soldering of circuit boards by the same respective compositions. For the purpose of such tests the boards were pre-fluxed and the preheat at the soldering apparatus was set to yield a top-of-the-board temperature of approximately 200°F. The pot temperature was set at either 495°F or 500°F. The conveyor speeds were varied to attain the best results. Where the soldering alloy of the invention was utilized the joints obtained were shiny with excellent wetting on the board and up to the holes thereof. Shallow filleting was observed. A board treated under comparable conditions with the conventional 60/40 alloy displayed shiny, shallow fillets. The alloy of the present invention, in general produced solder joints whose quality and appearance were indistinguishable from those produced by 60/40 alloy.

EXAMPLE II

Test joints produced by the composition of Example I were examined for micro-structure, and specifically were compared to test joints prepared under similar conditions, but by use of either a conventional 60/40 solder, or by the use of the nominal eutectic solder, i.e. a 63/37 solder. It was found that the alloy of the invention yielded in general, fine-grained micro-structures which more nearly resembled the micro-structures yielded by the idealized eutectic alloy, than did the conventional 60/40 solder. The mechanical properties of the joints yielded by use of the cited test alloy further, were superior to the same properties in joints of the 60/40 composition.

EXAMPLE III

A further composition in accordance with the invention was prepared, which included by weight approximately 52% tin, 4% antimony, and 45% lead. This composition was found to display a liquidus-to-solidus temperature range of approximately 18°F. When utilized in automated soldering environments it was found to yield soldered joints of characteristics similar to those of 60/40 solder joints produced under comparable conditions. This, in spite of the fact that the tin content of the new composition, in comparison to the 60/40 composition, was very much reduced, and therefore represented a significant cost saving to the manufacturer.

While the present invention has been particularly set forth in terms of specific embodiments thereof, it will be understood in view of the present disclosure, that numerous variations upon the invention are now enabled to those skilled in the art, which variations yet reside within the scope of the instant teaching. Accordingly, the invention is to be broadly construed, and limited only by the scope and spirit of the claims now appended hereto.

I claim:

1. In the process of machine soldering a workpiece by application thereto of liquid solder from a molten reservoir; the improvement wherein:
    said solder is an alloy consisting essentially of from about 50 to 57.5% by weight tin, from about 1.5 to 4% by weight antimony, and the balance being substantially lead.

2. A process in accordance with claim 1, wherein the compositional range of said alloy is such as to further characterize said alloy as displaying a solidus-to-liquidus temperature range no greater than that of a 60/40 weight ratio tin/lead solder.

3. A process in accordance with claim 1, wherein said alloy consists essentially of from about 51 to 54% by weight tin, from about 2 to 3.5% by weight antimony, and the balanace being substantially lead.

4. A process in accordance with claim 1, wherein said alloy by weight consists essentially of approximately 55% tin, 2.55% antimony, and 42.23% lead.
5. A process in accordance with claim 1, wherein said alloy by weight consists essentially of approximately 52% tin, 3% antimony, and 45% lead.

* * * * *